United States Patent
Thomas et al.

(10) Patent No.: US 9,937,834 B2
(45) Date of Patent: Apr. 10, 2018

(54) SEAT ASSEMBLY

(71) Applicant: GM GLOBAL TECHNOLOGY OPERATIONS LLC, Detroit, MI (US)

(72) Inventors: Scott D. Thomas, Novi, MI (US); Thomas A. Gillette, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 14/831,914

(22) Filed: Aug. 21, 2015

(65) Prior Publication Data

US 2016/0264029 A1 Sep. 15, 2016

Related U.S. Application Data

(60) Provisional application No. 62/130,827, filed on Mar. 10, 2015.

(51) Int. Cl.

| B60N 2/56 | (2006.01) |
| B60N 3/00 | (2006.01) |
| B60R 7/04 | (2006.01) |
| B60N 2/30 | (2006.01) |

(52) U.S. Cl.
CPC ......... B60N 2/5678 (2013.01); B60N 2/3009 (2013.01); B60N 2/3018 (2013.01); B60N 2/3036 (2013.01); B60N 2/5621 (2013.01); B60N 3/00 (2013.01); B60R 7/043 (2013.01)

(58) Field of Classification Search
CPC .. B60N 2/5678; B60N 2/3009; B60N 3/3018; B60N 2/5621; B60N 2/3036; B60N 3/00; B60N 70/543

USPC ................................................. 297/188.07
See application file for complete search history.

(56) References Cited

U.S. PATENT DOCUMENTS

| 2,136,407 A * | 11/1938 | Armour | ................. B60R 7/043 |
| | | | 297/188.07 X |
| 7,523,985 B2 * | 4/2009 | Bhatia | ................. B60N 2/206 |
| | | | 297/188.07 X |

FOREIGN PATENT DOCUMENTS

| DE | 102006025083 A1 | 12/2007 |
| FR | 2941662 B1 | 1/2011 |
| JP | 2004114830 A | 4/2004 |
| JP | 4939144 B2 | 5/2012 |
| WO | 9116217 A1 | 10/1991 |
| WO | 0013931 A1 | 3/2000 |

* cited by examiner

*Primary Examiner* — Anthony D Barfield
(74) *Attorney, Agent, or Firm* — Quinn IP Law

(57) ABSTRACT

A seat assembly includes a seatback having a seatback body and a door pivotally coupled to the seatback body. The seatback defines an internal compartment and an opening leading to the internal compartment. The seatback defines a first seatback edge and a second seatback edge opposite the first seatback edge. The door can rotate relative to the seatback body about an axis, which extends from the first seatback edge to the second seatback edge. The door can move relative to the seatback between an open position and a closed position, and covers the opening leading to the internal compartment when disposed in the closed position. The internal compartment is accessible through the opening when the door is in the open position. The seat assembly further includes a seat base below the seatback. The first seatback edge is closer to the seat base than the second seatback edge.

18 Claims, 5 Drawing Sheets

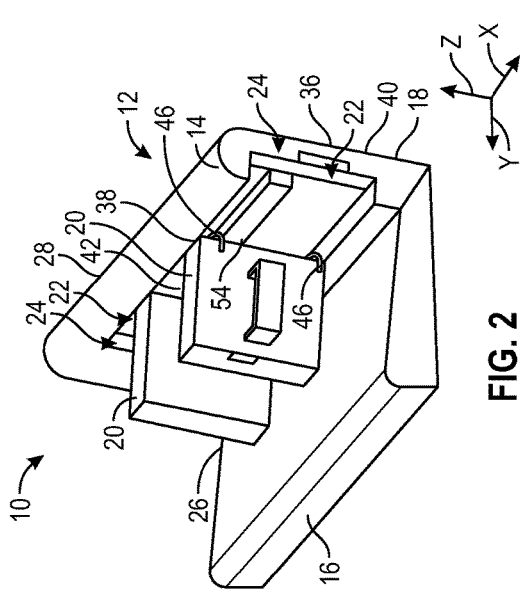
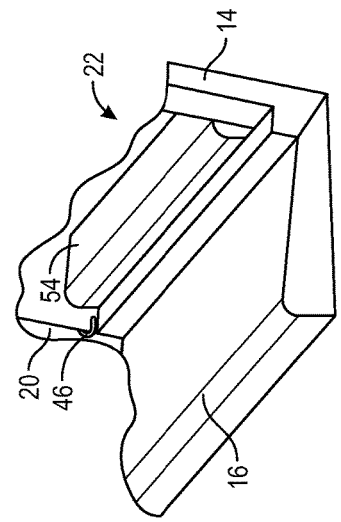
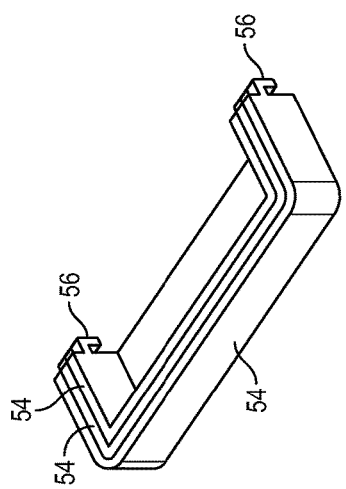
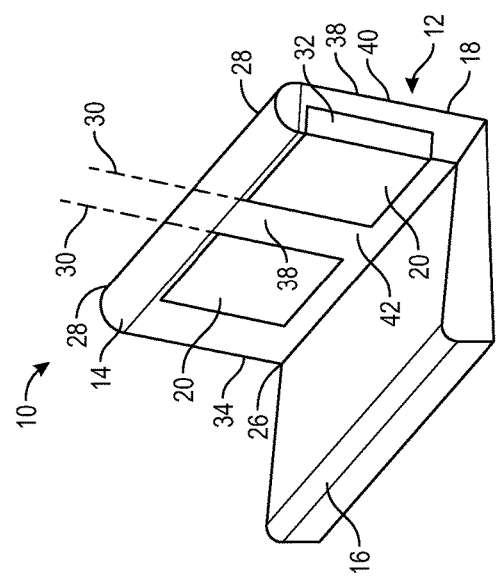

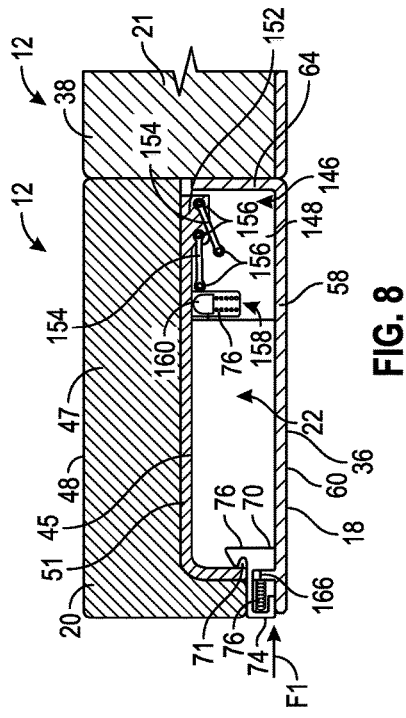
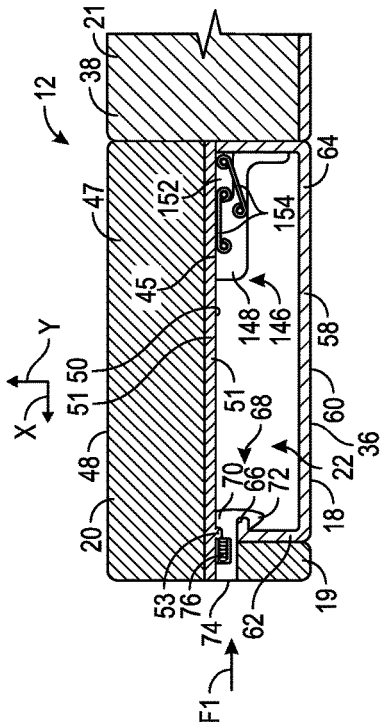
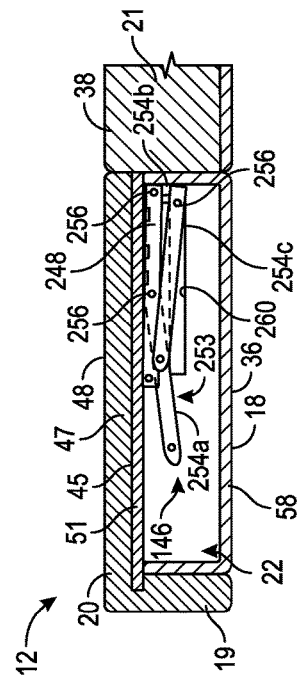
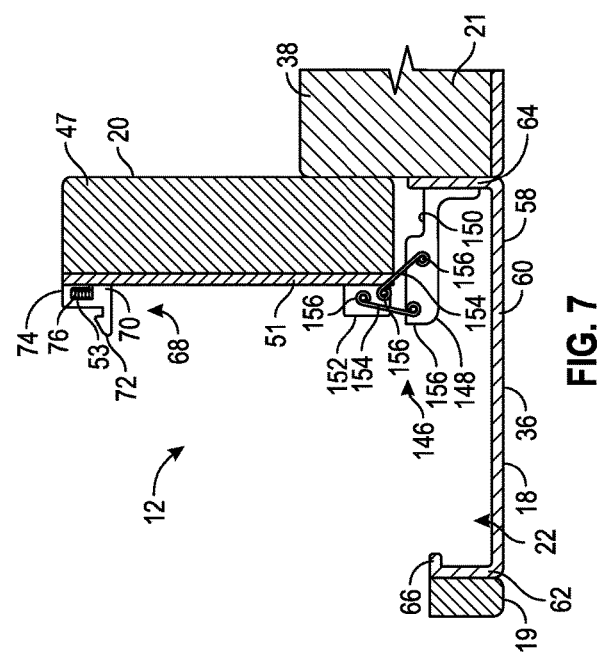

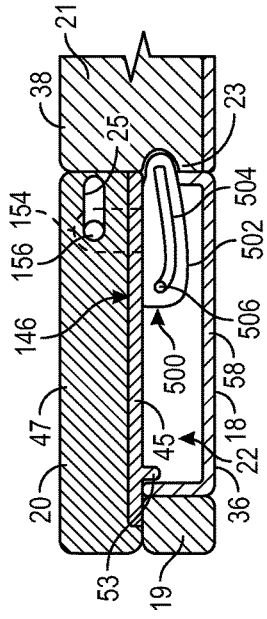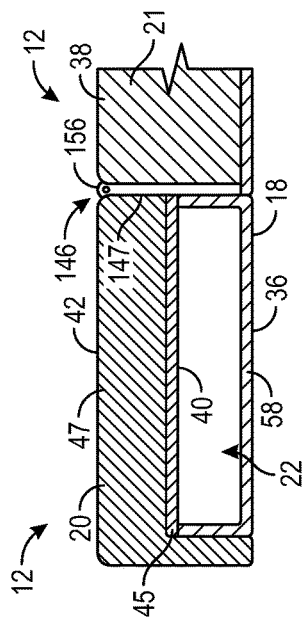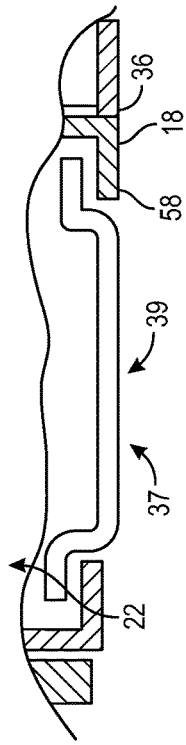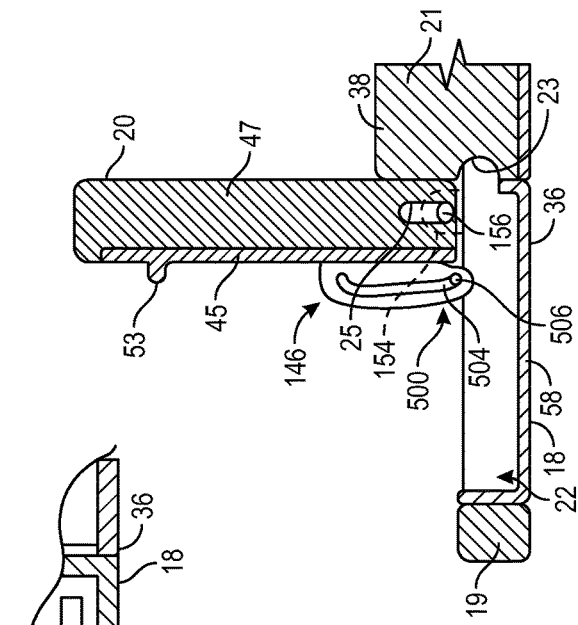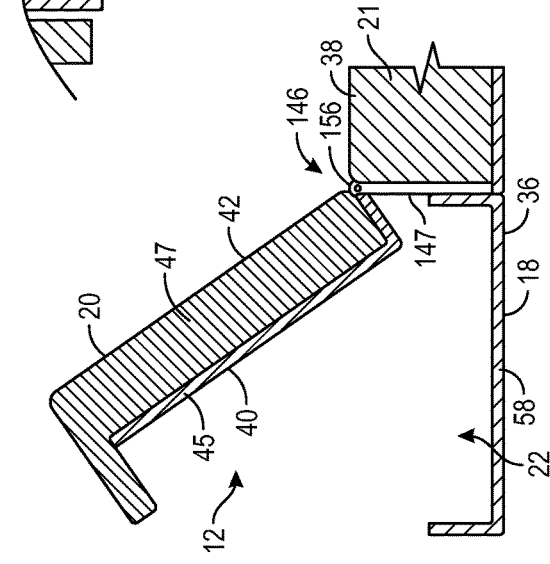

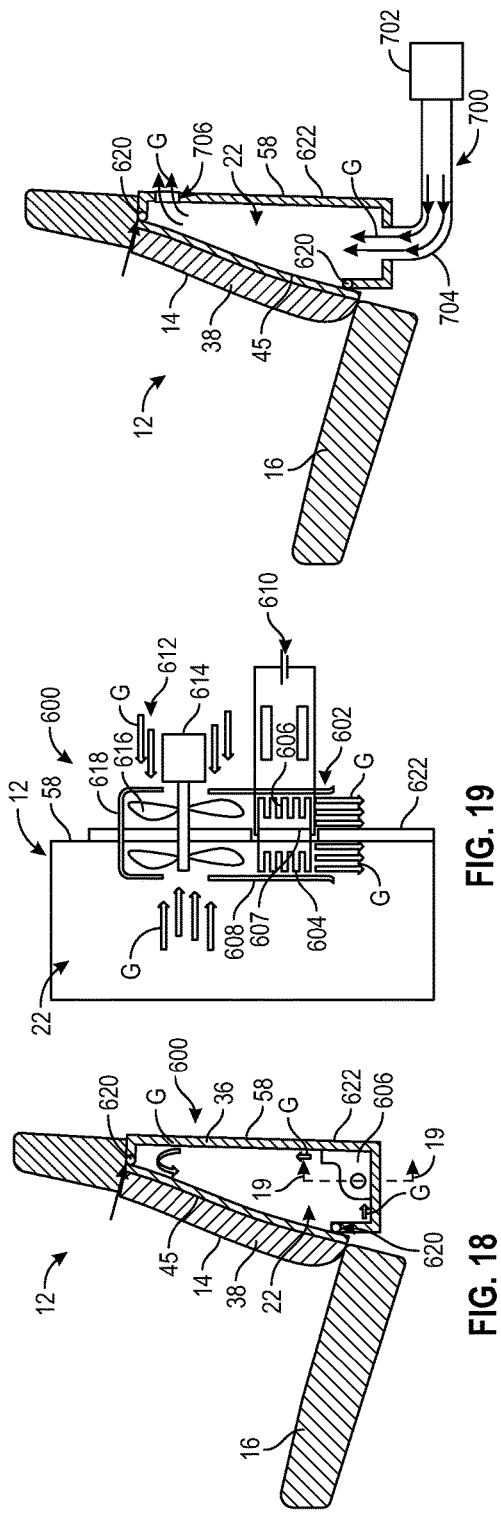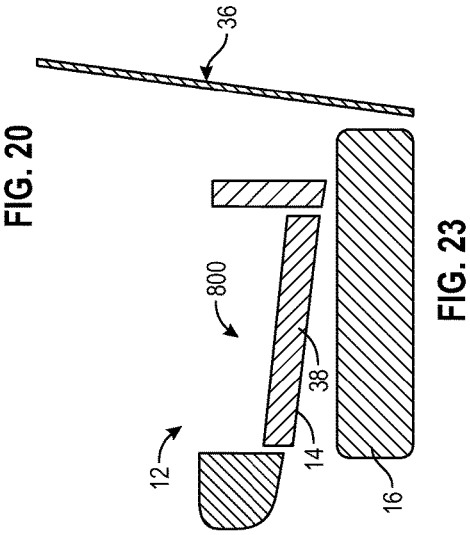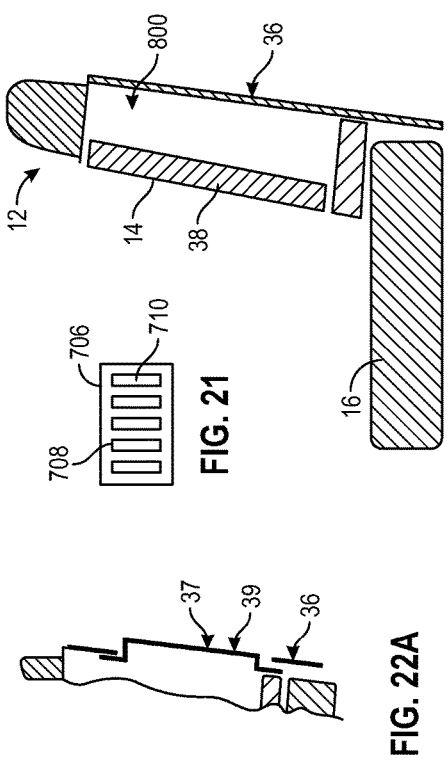

SEAT ASSEMBLY

CROSS-REFERENCE TO RELATED APPLICATIONS

This application claims priority to and the benefit of U.S. Provisional Patent Application No. 62/130,827, filed on Mar. 10, 2015, which is hereby incorporated by reference in its entirety.

TECHNICAL FIELD

The present disclosure relates to a seat assembly including a seatback, wherein the seatback has an internal compartment for storing items.

BACKGROUND

Vehicles, such as cars, may include storage compartments, such as the trunk. The trunk, however, is not easily accessible from the vehicle passenger compartment. For this reason, some people just place items on the seats inside the vehicle passenger compartment.

SUMMARY

While items can be stored in a vehicle passenger compartment, these items, if not properly secured, can move while the vehicle is in motion. Therefore, items inside a vehicle passenger compartments should be properly secured. The presently disclosed seat assembly includes an internal compartment for storing and securing items. After the items are secured inside this internal compartment, passengers can comfortably sit on the seat assembly. The seat assembly may also include a thermal control system to cool or heat the seatback internal compartment in order to provide temperature control for items that may be stored in the internal compartment.

In an embodiment, the seat assembly includes a seatback having a seatback body and a door pivotally coupled to the seatback body. The seatback defines an internal compartment and an opening leading to the internal compartment. Further, the seatback defines a first or bottom seatback edge and a second or top seatback edge opposite the first seatback edge. The door can rotate relative to the seatback body about an approximate axis, which extends from the first seatback edge to the second seatback edge. For example, the axis may extend in a generally vertical orientation or be aligned with the seatback. The door can move relative to the seatback between an open position and a closed position. In the closed position, the door covers the opening leading to the internal compartment. When the door is in the open position, the internal compartment is accessible through the opening. The seat assembly further includes a seat base below the seatback, and the first or bottom seatback edge is closer to the seat base than the second or top seatback edge. A thermal control system may be at least disposed inside the internal compartment. The thermal control system can heat and/or cool the seatback internal compartment. A pass-through with a removable or hinged panel may also be present at the back of the compartment, which when open will allow access to the volume of the vehicle behind the compartment.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic, perspective view of a seat assembly including doors in a closed position;

FIG. 2 is a schematic, perspective view of the seat assembly shown in FIG. 1, depicting the doors in the open position;

FIG. 3 is a schematic, perspective rear view of one of the doors shown in FIG. 1, wherein shelves and a sleeve are coupled to the door;

FIG. 4 is a schematic, perspective view of a plurality of nested shelves;

FIG. 5 is a schematic, perspective, partial view of a seat assembly, depicting one or more shelves disposed inside the internal compartment of the seatback;

FIG. 6 is a schematic, top sectional view of a seat assembly in accordance with an embodiment of the present disclosure, wherein the seatback includes a hinge mechanism pivotally coupling a door to a seatback and a latch coupled to the door;

FIG. 7 is a schematic, top sectional view of a seat assembly of FIG. 6, showing the door in the open position;

FIG. 8 is a schematic, top sectional view of a seat assembly in accordance with an embodiment of the present disclosure, wherein the seat assembly includes a latch coupled to the seatback;

FIG. 9 is a schematic, top sectional view of a seat assembly in accordance with another embodiment of the present disclosure, wherein the seat assembly includes a hinge mechanism capable of moving the door laterally;

FIG. 14 is a schematic, top sectional view of a seat assembly in accordance with another embodiment of the present disclosure, wherein the hinge mechanism is at least partially disposed adjacent a seating surface;

FIG. 15 is a schematic, top sectional view of the seat assembly shown in FIG. 14, showing the door in the open position;

FIG. 15A is a schematic, fragmentary, sectional top view of a portion of the seat assembly shown in FIG. 15;

FIG. 16 is a schematic, top sectional view of a seat assembly in accordance with an embodiment of the present disclosure, wherein the hinge mechanism is composed of one or more slots;

FIG. 17 is a schematic, top sectional view of the seat assembly shown in FIG. 16, wherein the door is in the open position;

FIG. 18 is a schematic, sectional side view of a seat assembly including a thermal control system, wherein the thermal control system includes a thermoelectric device at least partially disposed inside the internal compartment of the seatback;

FIG. 19 is a schematic, sectional front view of the thermoelectric device at least partially disposed inside the internal compartment of the seatback, taken along section line 19-19 of FIG. 18;

FIG. 20 is a schematic, sectional side view of a seat assembly including a thermal control system in accordance with another embodiment of the present disclosure;

FIG. 21 is a schematic, front view of a vent of the thermal control system of FIG. 20;

FIG. 22 is a schematic, side view of a seat assembly including a seatback defining an open tray;

FIG. 22A is a schematic, fragmentary, side view of a portion of the seat assembly shown in FIG. 22; and FIG. 23 is a schematic, side view of the seat assembly of FIG. 18, showing the seatback in the folded down position.

DETAILED DESCRIPTION

Figure 10:
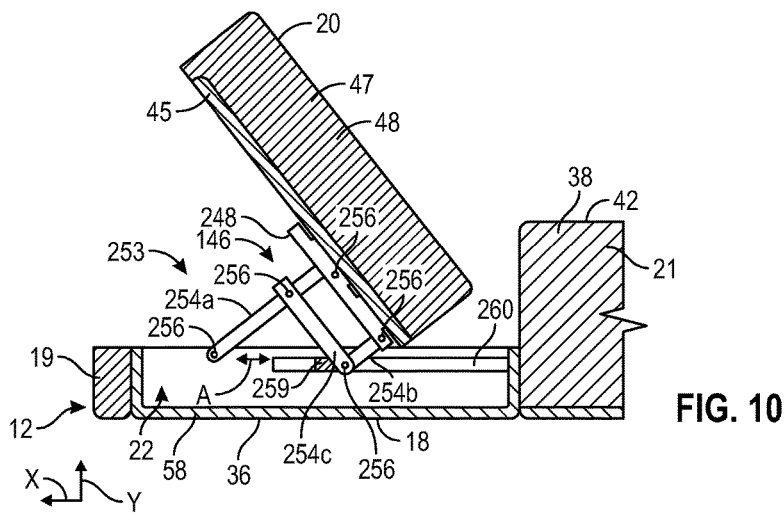
FIG. 10 is a schematic, top sectional view of the seat assembly shown in FIG. 8, depicting the door in the open position.

Referring to the drawings, wherein like reference numbers correspond to like or similar components throughout the several figures, and beginning with FIGS. 1 and 2, a vehicle 10 includes a seat assembly 12. The vehicle 10 may be a car, a truck, a boat, an airplane, or any other suitable vehicle. The seat assembly 12 is disposed inside a passenger compartment and includes a seatback 14 and a seat base 16 below the seatback 14 which may or may not be coupled to the seatback 14. The seat base 16 may be at least partially in direct contact with the seatback 14. The seatback 14 can support a passenger's back while the passenger sits on the seat base 16. The seat base 16 extends approximately along a first or longitudinal direction Y and a second or lateral direction X. The seatback 14 extends approximately along a third or vertical direction Z and the lateral direction X. The lateral direction X is perpendicular to the vertical direction Z and the longitudinal direction Y.

The seatback 14 includes a seatback body 18 and defines an internal compartment 22 (e.g., an inner cavity) inside the seatback body 18. In addition, the seatback 14 includes at least one door 20 movably (e.g., pivotally) coupled to the seatback body 18. Accordingly, each door 20 can move (e.g., pivot) relative to the seatback body 18 between the open position (FIG. 2) and the closed position (FIG. 1). The seatback 14 also defines at least one opening 24 leading to the internal compartment 22, and each door 20 covers at least one opening 24 when disposed in the closed position. When the door 20 is in the open position, the internal compartment 22 is accessible through the opening 24. The doors 20 and the seatback body 18 collectively enclose the entirety of the internal compartment 22 when the doors 20 are in the closed position.

The seatback body 18 defines a first or top seatback edge 28 and a second or bottom seatback edge 26 opposite the first seatback edge 28. The second seatback edge 26 is spaced from the first seatback edge 28 along the approximately vertical direction Z. Accordingly, the first seatback edge 26 is closer to the seat base 16 than the second seatback edge 28. In the depicted embodiment, each door 20 rotates (e.g., pivots) relative to the seatback body 18 about an approximate axis 30, and each approximate axis 30 extends from the first seatback edge 26 to the second seatback edge 28. For example, each axis 30 can extend along the approximately vertical direction Z. In other words, the axes 30 may be approximately vertically aligned relative to the vehicle 10 in order to allow the doors 20 to swing open without interfering with the adjacent trim of the seat assembly 12.

The seatback body 18 also defines a first lateral wall 32 and a second lateral wall 34 opposite the first lateral wall 32. At least one of the doors 20 may extend (and partially form) the first lateral wall 32 and/or the second lateral wall 34. In the depicted embodiment, for example, the right one of the doors 20 partially forms the first lateral wall 32. Further, at least one of the doors 20 may extend all the way to the first seatback edge 26. For instance, in the depicted embodiment, only the left one of the doors 20 extends to the first seatback edge 26.

The seatback body 18 also includes a seat backing 36 and a compressible seat portion 38 coupled to the seat backing 36. The seat backing 36 is wholly or partly made of a rigid material, such as a rigid polymer or metal, in order to support the weight of a vehicle occupant sitting on the seat assembly 12. The compressible seat portion 38 is wholly or partly made of a compressible material, such as a polymeric foam and a flexible suspension, in order to comfortably support a vehicle occupant's back when the vehicle occupant sits on the seat assembly 12.

The seat backing 36 may define a first or rear seatback surface 40 and a second or front seatback surface 42 opposite the first seatback surface 40. The first seatback surface 40 is spaced from the second seatback surface 42 approximately along the longitudinal direction Y. The second seatback surface 42 may be referred to as the seating surface, because the vehicle passenger's back contacts the second seatback surface 42 when the vehicle occupant sits on the seat assembly 12. The seat assembly 12 may further include one or more support structure components (not shown) coupled to the seat backing 36 inside the internal compartment 22 in order to enhance the structural integrity of the seat assembly 12.

The seatback 14 also includes hinge mechanisms 46 each pivotally coupling a door 20 to the seatback body 18. The hinge mechanisms 46 enable to the door 20 to rotate relative to the seatback body 18 about an approximate axis 30 between the closed position (FIG. 1) and the open position (FIG. 2).

With reference to FIGS. 3-5, the door 20 may have a cuboidal shape in order to fit in the opening 24 and includes a door backing 45 and a compressible door portion 47 coupled to the door backing 45. The door backing 45 is wholly or partly made of a rigid material, such as a rigid polymer or metal, in order to support the weight of a vehicle occupant sitting on the seat assembly 12 and the door 20 is in the closed position. The door backing may contain stiffening ribs or other structure (not shown) to stiffen it. The compressible door portion 47 is wholly or partly made of a compressible material, such as a polymeric foam, in order to comfortably support a vehicle occupant's back when the vehicle occupant sits on the seat assembly 12 and the door 20 is in the closed position. In addition the compressible door portion 47 may contain an adjustable lumbar system such as a bladder or moving mechanism (not shown) to adjust the stiffness and shape of the compressible door portion 47 adjacent the occupant's lumbar region. The means to adjust the adjustable lumbar system would likely involve a remote actuator with the cable system connecting the remote actuator and the adjustable lumbar system with the cable system routing near the hinged edge of the door 20. Moreover, the compressible door portion 47 defines a first or front door surface 48, and the door backing 45 defines a second or rear door surface 50 opposite the first door surface 48. The first door surface 48 is spaced from the second door surface 50 approximately along the longitudinal direction Y and may be referred to as a seating surface, because the vehicle passenger's back contacts the first door surface 48 when the vehicle occupant sits on the seat assembly 12 and the door 20 is in the closed position. The door 20 may include a sleeve 52 coupled to the door backing 45 at the second door surface 50. The sleeve 52 can be used to store items, such as a vehicle's owner's manual, service records, magazines or newspapers. One or more coat hooks (not shown) or other hooks (not shown) may also be placed on the door 20 to hang articles of clothing or grocery bags. The door 20 may include at least one shelf 54 coupled to the door backing 45 at the second door surface 50. In the depicted embodiment, several shelves 54 are nested together and are coupled to the second door surface 50. It is contemplated, however, that only one shelf 54 may be coupled to the door backing 45. As shown in FIG. 4, the shelves 54 may include shelf hooks 56 in order to allow the shelves 54 to be removably coupled to the second door surface 50. A similar shelf hook 56 may be used to allow removal of a sleeve, coat hook or other hook. The temporary retaining feature such as the shelf hook 56 may also be reversed with the hook receiving portion on the removable shelf 54, sleeve, coat hook and other hook with the hook portion mounted on the door 20. Other temporary mechanical attachments are possible. One or more of the nested shelves 54 can therefore be decoupled from the second door surface 50, flipped upside-down, and placed inside the internal compartment 22 to define a raised bottom or hidden storage region in the internal compartment 22, as shown in FIG. 5. The shelves 54 can be attached to and removed from the internal compartment 22. Returning to FIG. 2, the internal compartment may have one or more shelves 54 mounted on the inside. In addition, the internal compartment 22 may have one or more coat hooks (not shown) other hooks (not shown) and sleeves (not shown) mounted within it. The one or more shelves, coat hooks, other hooks, and sleeves can be either permanently mounted or temporarily mounted with features similar to shelf hook 56 or other temporary mechanical attachments.

With reference to FIGS. 6 and 7, as discussed above, the door 20 is movably coupled to the seatback body 18 and can therefore move (e.g., rotate) between a closed position (FIG. 6) and an open position (FIG. 7). The seat backing 36 of the seatback body 18 includes a compartment backing portion 58 partially defining the internal compartment 22. The compartment backing portion 58 can be directly coupled to the compressible seat portion 38 or adjacent to it and is wholly or partly made of a rigid material, such as a rigid polymer or metal, in order to support the weight of a vehicle occupant sitting on the seat assembly 12. The compressible portion 38 can be fixed in space or can be designed to rotate or move to provide an arm rest or a pass-through to a compartment aft of it. Returning to the door 20, the door 20 moves relative to the seatback body 18, the compartment backing portion 58 remains stationary in relation to the seatback body 18. In the depicted embodiment, the seatback body 18 includes a lateral body portion 19 and a central body portion 21, and the compartment backing portion 58 is coupled to (and entirely disposed between) the lateral body portion 19 and possibly the central body portion 21. The compartment backing portion 58 includes a first or central backing wall 60, a second backing wall 62 coupled to the first backing wall 60, and a third backing wall 64 coupled to the first backing wall 60. The first backing wall 60 may directly interconnect the second backing wall 62 and the third backing wall 64. The second backing wall 62 and the third backing wall 64 may be perpendicular to the first backing wall 60 in order to maximize space in the internal compartment 22. The third backing wall 64 can be directly coupled to the lateral body portion 19, and the second backing wall 62 can be directly coupled to the central body portion 21. The compartment backing portion 58 further includes a backing protrusion 66 extending directly from the second backing wall 62. The backing protrusion 66 can be perpendicular to the second backing wall 62 and the third backing wall 64 and parallel to the first backing wall 60 in order to maximize storage space in the internal compartment 22. The door backing 45 includes a door backing wall 51 directly coupled to the compressible door portion 47 and a door protrusion 53 extending directly from the door backing wall 51 in a direction away from the compressible door portion 47. The door backing wall 51 would preferably be oriented so that it shingles over the second backing wall 62 and third backing wall 63 of the compartment backing portion 58 so that the door 20 is supported by the compartment backing portion 58 when an occupant is sitting in the seat.

The seat assembly 12 includes a latch mechanism 68 configured to couple (e.g., lock) the door 20 to the seatback body 18 when the door 20 is in the closed position. The latch mechanism 68 includes a latch 70 movably coupled to the door 20. Specifically, the latch 70 can be movably coupled to the door backing 45, thereby allowing the latch 70 to move (e.g., translate) relative to the door 20 along the lateral direction X. In the depicted embodiment, the latch 70 includes a hook 72 and a button 74 coupled to the hook 72. The hook 72 is configured, shaped, and sized to latch onto the backing protrusion 66 in order to couple the door 20 to the seatback body 18 when the door 20 is in the closed position. In other words, the hook 72 can move (e.g., translate) relative to the door 20 between a locked position (FIG. 6) and an unlocked position (FIG. 7). To move the hook 72 from the locked position to the unlocked position, the button 74 can receive a release force F1 in order to move the hook 72 away from the backing protrusion 66, thereby disengaging the hook 72 from the backing protrusion 66. When the hook 72 is disengaged from the backing protrusion 66, the door 20 is unlocked (in relation to the seatback body 18) and can therefore move from the closed position to the open position. The latch mechanism 68 further includes a biasing member 76, such as a spring (e.g., coil spring), disposed between the door protrusion 53 and the button 74 in order to bias the hook 72 toward the locked position (FIG. 6). In other words, the biasing member 76 can bias the hook 72 toward the backing protrusion 66. To unlock the door 20 from the seatback body 18, the release force F1 should be sufficiently strong to overcome the biasing force exerted by the biasing member 76. While seat assembly 12 may include the particular latch mechanism 68 described above, it is envisioned that the seat assembly 12 may alternatively include other suitable latch mechanisms, such as rotating latches, translating latches, latches made of multiple parts, various remote latch configurations such as those with a mechanical attachment between the latch and the button such as a cable or a cable in a tube, among others.

In the embodiment depicted in FIGS. 6 and 7, the hinge mechanism 146 includes a hinge bracket 148 directly coupled to the compartment backing portion 58 such as with one or more mechanical fasteners. Specifically, the hinge bracket 148 can be directly coupled to the third backing wall 64. Accordingly, the hinge bracket 148 remains stationary relative to the seatback body 18 while the door 20 moves between the open position and the closed position. The hinge bracket 148 defines a bracket recess 150. The hinge mechanism 146 is at least partially located closer to the second door surface 50 than to the first door surface 48 in order to maximize passenger comfort. Further, the hinge mechanism 146 further includes a hinge block 152 directly coupled to the door backing 45 such as with one or more mechanical fasteners. In particularity, the hinge block 152 can be directly coupled to the door backing wall 51. In this manner the hinge mechanism may be a separate sub-assembly which is attached to both the door 20 and the compartment backing portion 58 similar to the similar hinging mechanisms used in bathroom and kitchen cabinets with hinge positioning features similar to these designs. Accordingly, the hinge block 152 moves along with the door 20 when the door 20 moves relative to the seatback body 18 between the open position and the closed position. If the hinge mechanism 146 and the hinge block 152 are located along the same vertical plane, the hinge block 152 can be configured, shaped, and sized to be received in the bracket recess 150 when the door 20 is in the closed position. Thus, the bracket recess 150 can be configured, shaped, and sized to receive the hinge block 152 when the door 20 is in the closed position. A plurality of hinge links 154 are pivotally coupled between the hinge bracket 148 and the hinge block 152. Specifically, a plurality of pivot pins 156 pivotally couple each hinge link 154 to the hinge bracket 148 and the hinge block 152. In particular, each hinge link 154 is coupled to one pivot pin 156 attached to the hinge bracket 148 and another pivot pin 156 attached to the hinge block 152. Consequently, when the door 20 moves relative to the seatback body 18, each hinge link 154 pivots about a pivot pin 156 attached to the hinge bracket 148 and a pivot pin 156 attached to the hinge block 152. In this embodiment, the hinge mechanism 146 is entirely disposed behind and outside the compressible door portion 47 so that the hinge mechanism 146 does not interfere with the compressibility of the compressible door portion 47, thereby enhancing the vehicle occupant's comfort. The hinge mechanism 146 is also entirely disposed outside the compressible seat portion 38 so that the hinge mechanism 146 does not interfere with the compressibility of the compressible seat portion 38. Of significance, the hinge mechanism 146 is a 4-bar linkage which enables the door 20 to pivot open in a manner where any door 20 contact with the central body portion 21 is minimized or eliminated. The edge of the door 20 adjacent the hinge mechanism moves toward the internal compartment 22 centerline as the door pivots open swinging approximately but not exactly about a specific axis 30, as shown in FIG. 1 since 4-bar linkages do not pivot about a single axis but utilize an axis that shifts or moves as the hinge rotates.

With reference to FIG. 8, the structure and operation of the seat assembly 12 shown in FIG. 8 is similar to the structure and operation of the seat assembly 12 shown in FIGS. 6 and 7. In the interest of brevity, the differences between the embodiment shown in FIG. 8 and the embodiment shown in FIGS. 6 and 7 are described below. The compartment backing portion 58 does not include the second backing wall 62 (FIG. 7). Rather, the compartment backing portion 58 includes a retaining protrusion 166 extending from the first backing wall 60 at least partially in a direction toward the compressible door portion 47. The retaining protrusion 166 can retain a biasing member 76 between the button 74 and the hook 72 of the latch 70. Instead of being coupled to the door 20, the latch 70 is coupled to the compartment backing portion 58 even when the door 20 is in the open position. The hook 72 can move (e.g., translate) relative to the compartment backing portion 58 between a locked position and an unlocked position. In the locked position, the hook 72 latches onto a door backing protrusion 71 of the door backing 45. The door backing protrusion 71 extends directly from the door backing wall 51 in a direction toward the central body portion 21 when the door 20 is in the closed position. The biasing member 76 (e.g., spring) biases the hook 72 toward the locked position. To unlock the latch 70, a release force F1 can be applied to the button 74 against the bias of the biasing member 76 in order to move the hook 72 away from a door backing protrusion 71 of the door backing 45, thereby disengaging the hook 72 from the door backing protrusion 71 of the door backing 45.

In the embodiment depicted in FIG. 8, the hinge bracket 148 extends all the way to (and is in direct contact with) the compartment backing portion 58 in order to enhance the structural stability of the hinge mechanism 146. The hinge links 154 of the hinge mechanism 146 may be plastic dog bone shaped links in order to minimize weight while maintaining the structural integrity of the hinge mechanism 146. It is envisioned, however, that the hinge links 154 may be made of a metallic material. The hinge block 152 of the hinge mechanism 146 may be integrally formed with the door backing 45 in order to minimize costs. Likewise, the hinge pins 156 may be integrally formed with either the hinge block 152 or the portion of the compartment backing portion 58. As used herein, the term "integrally formed" means that two or more parts are formed as a one-piece structure. In this manner, one or more portions of the hinge may be attached to the door backing 45 or the compartment backing portion 58. The hinge block 152 defines an open cavity 158 configured, shaped, and sized to receive a biasing member 76, such as a spring. The biasing member 76 in the open cavity 158 can bias the door 20 toward a partially open position when the latch 70 is unlocked from the door 20. A head 160 can be coupled to the biasing member 76 disposed in the open cavity 158 to aid the biasing member 76 (e.g., spring) in moving the door 20 toward its partially open position. Another alternative (not shown) is that the hinge mechanism for this embodiment or any embodiment herein could contain an internal biasing mechanism, similar to the hinge mechanisms used in bathroom or kitchen cabinets.

With reference to FIGS. 9 and 10, the structure and operation of the seat assembly 12 shown in FIG. 8 is similar to the structure and operation of the seat assembly 12 shown in FIGS. 9 and 10. In the interest of brevity, the differences between the embodiment shown in FIG. 8 and the embodiment shown in FIGS. 9 and 10 are described below. In this embodiment, the hinge mechanism 146 can at least partially slide and rotate, thereby allowing the door 20 to rotate and translate (e.g., slide) relative to the seatback body 18 in order to move the door 20 away from the central body portion 21 of the seatback 14 while the door 20 moves to the open position. By moving the door 20 away from the central body portion 21, the hinge mechanism 146 in this embodiment facilitates opening the door 20.

With continued reference to FIGS. 9 and 10, the hinge mechanism 146 includes a door bracket 248 and a linkage assembly 253 movably coupled to the door bracket 248. The door bracket 248 is directly coupled to the door backing 45. Accordingly, the door bracket 248 moves along with the door 20 when the door 20 moves between the closed position (FIG. 9) and the open position (FIG. 10). The linkage assembly 253 includes a first link 254a and a second link 254b each pivotally coupled to the door bracket 248. The first link 254a and the second link 254b are wholly or partly made of a rigid material, such as a rigid metal or a rigid polymer, in order to allow the linkage assembly 253 to facilitate movement of the door 20 relative to the seatback body 18. Pivot pins 256 can pivotally couple the first link 254a and the second link 254b to the door bracket 248. Accordingly, the first link 254a and the second link 254b can pivot relative to the door bracket 248 about their respective pivot pins 256. The linkage assembly 253 further includes a third link 254c pivotally coupled to the first link 254a and the second link 254b. Pivot pins 256 can pivotally couple the third link 254c to the first link 254a and the second link 254b. The third link 256c is wholly or partly made of a rigid material, such as a rigid metal or a rigid polymer, in order to allow the linkage assembly 253 to facilitate movement of the door 20 relative to the seatback body 18. A pivot pin 256 also pivotally couples the first link 254a to the seatback body 18. The pivot pin 256 coupling the first link 254a to the seatback body 18 remains stationary relative to the seatback body 18. The pivot pin 256 interconnecting the second link 254b and the third link 254c also pivotally couples the second link 254b and the third link 254c to a sliding block 259. The sliding block 259 is configured, shaped, and sized to slide along a channel 260 formed by the seatback body 18. Accordingly, the channel 260 is configured, shaped, and sized to slidably receive and potentially encapsulate the sliding block 259. When the door 20 moves between the open position and the closed position, the first link 254a, the second link 254b, and the third link 254c pivot about their respective pivot pins 256 while the sliding block 259 slides along the channel 260 in the direction indicated by double arrows A. In other words, the sliding block 259 can slide along the lateral direction X when the door 20 moves between the open position and the closed position. While the door 20 moves from the closed position to the open position, the door 20 can move (e.g., slide) laterally away from the central body portion 21 of the seatback body 14. In the open position, the door 20 is partially disposed behind the second seatback surface 42 (i.e., the seating surface) of the central body portion 21 in order to facilitate access to the internal compartment 22. This approach is similar to that found in casement windows. Due to the complex motion of this hinge mechanism 146 in FIGS. 9 and 10 the axis of hinge rotation also changes as the hinge rotates open and shut.

Figure 11:
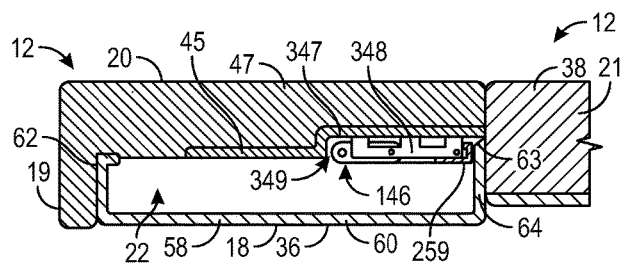
FIG. 11 is a schematic, top sectional view of a seat assembly in accordance with an embodiment of the present disclosure, wherein the hinge mechanism is at least partially disposed in a recessed portion of the door.
Figure 12:
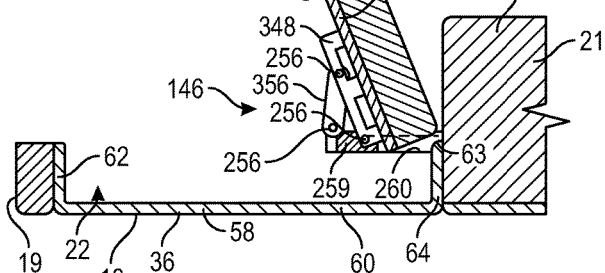
FIG. 12 is a schematic, top sectional view of the seat assembly shown in FIG. 11, showing the door in the open position.

With reference to FIGS. 11 and 12, the structure and operation of the seat assembly 12 shown in FIGS. 9 and 10 is similar to the structure and operation of the seat assembly 12 shown in FIGS. 9 and 10. In the interest of brevity, the differences between the embodiment shown in FIGS. 9 and 10 and the embodiment shown in FIGS. 11 and 12 are described below. In this embodiment, the hinge mechanism 146 is disposed in a recessed portion 347 of the door backing 45 in order to facilitate movement of the door 20 between the closed position (FIG. 11) and the open position (FIG. 12). The hinge mechanism 146 includes a single link 356 coupled to a door bracket 348. The door bracket 348 is directly coupled to the door backing 45 and is entirely or partially disposed inside a recess 349 defined by the recessed portion 347 of the door backing 45 in order to facilitate movement of the door 20 relative to the seatback body 18. The link 356 is pivotally coupled to the door bracket 348 and the seatback body 18. A pivot pin 256, which remains stationary relative to the seatback body 18, pivotally couples the link 356 to the seatback body 18. Another pivot pin 256 pivotally couples the link 356 to the door bracket 348. Yet another pivot pin 256 pivotally couples the door bracket 348 to the sliding block 259. The sliding block 259 can slide along a channel 260 formed by the seatback body 18 along the direction indicated by double arrows A. Due to the complex motion of this hinge mechanism 146 in FIGS. 11 and 12 the axis of hinge rotation also changes as the hinge rotates open and shut. The second backing wall 62 of the compartment backing portion 58 has a tapered edge 63 to facilitate movement of the door 20 relative to the seatback body 18. The tapered edge 63 defines an oblique angle relative to the first backing wall 60.

Figure 13:
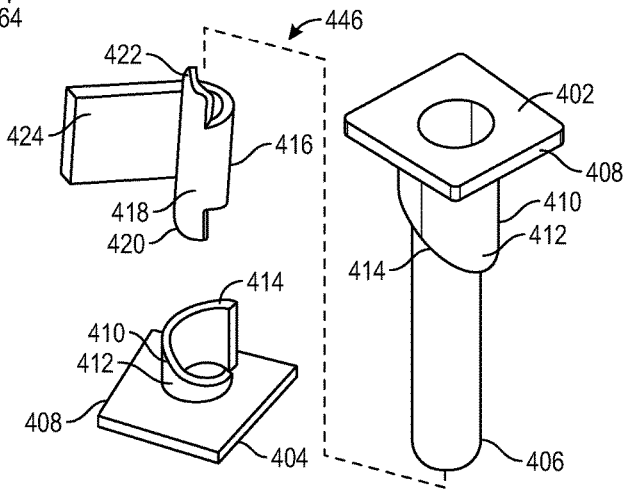
FIG. 13 is a schematic, perspective, exploded view of a hinge mechanism including tapered pivot bases configured to raise the door while it moves from the closed position to the open position.

With reference to FIG. 13, any of the embodiments described herein may include a hinge mechanism 446 that can raise the door 20 as the doors 20 moves to the open position. The hinge mechanism 446 includes a first hinge base 402, a second hinge base 404, and a hinge pin 406 coupled between the first hinge base 402 and the second hinge base 404. The hinge pin 406 can be a discrete component separate from the first hinge base 402 and the second hinge base 404. Alternatively, the hinge pin 406 can be integrally formed with either the first hinge base 402 or the second hinge base 404. Any of the hinge pin 406, the first hinge base 402 and the second hinge base 404 can be integrally formed (e.g., molded) with the door 20 or the seatback body 18 such as via surfaces 408. Alternatively, any of the hinge pin 406, the first hinge base 402 and the second hinge base 404 can be discrete components coupled to the door 20 or the seatback body 18. The hinge pin 406 may be wholly or partly made of a rigid material, such as a rigid metal or a rigid polymer, and may have a cylindrical shape in order to facilitate movement of the door 20. Each of the first hinge base 402 and the second hinge base 404 includes a ramp 410 optionally coupled to a surface 408. The surfaces 408 may be wholly or partly made of a rigid material, such as a rigid metal or a rigid polymer, and may have a cuboid shape in order to enhance the structural integrity of the hinge mechanism 446. Each ramp 410 includes a cylindrical body 412 with a helical edge 414. The cylindrical body 412 can receive the hinge pin 406, whereas the helical edge 414 helps raise the door 20 as the door 20 moves from the closed position to the open position. The hinge mechanism 446 additionally includes a hinge barrel 416. The hinge barrel 416 includes a barrel body 418 configured, shaped, and sized to receive the hinge pin 406. Accordingly, the hinge barrel 416 is coupled to the hinge pin 406 and disposed between the first hinge base 402 and the second hinge base 404. The hinge barrel 416 further includes a first flange 420 and a second flange 422 protruding from the barrel body 418 in opposite directions. The first flange 420 and the second flange 422 are angled and can slide along the helical edges 414 of the ramps 410 in order to raise the door 20 as the doors 20 moves relative to the seatback body 18. Accordingly, as the door 20 moves relative to the seatback body 18, the first hinge base 402 and/or the second hinge base 404 remain oriented with respect to each other, allowing the hinge barrel to travel along the helical edges thereby facilitating raising the door 20 as it opens. The hinge barrel 416 further includes an attachment portion 424 extending from the barrel body 418. The attachment portion 424 can be attached to a portion of the door assembly 20 or the seat assembly 12 in order to stabilize the hinge mechanism 446. In addition, another option is that the hinge links for one hinge may be a different length than the hinge links for the other hinge so that the door pivots a predetermined amount as it opens. For instance, making the links for the top hinge longer may allow the door to be in a more vertical orientation when opened as it wouldn't be swinging about an axis that approximates the seat back angle.

With reference to FIGS. 14 and 15, the structure and operation of the seat assembly 12 shown in FIGS. 11 and 12 is similar to the structure and operation of the seat assembly 12 shown in FIGS. 14 and 15. In the interest of brevity, the differences between the embodiment shown in FIGS. 11 and 12 and the embodiment shown in FIGS. 14 and 15 are described below. In this embodiment, the hinge mechanism 146 is at least partially disposed adjacent the first seatback surface 42 (e.g., the seating surface). Specifically, the hinge mechanism 146 includes a pivot pin 156 that is disposed closer to the second seatback surface 42 than to the first seatback surface 40 when the door 20 is in the closed position in order to simplify manufacturing of this hinge mechanism 146. The pivot pin 156 pivotally couples the door 20 to the seatback body 18. In this embodiment, the hinge mechanism 146 further includes a hinge frame 147 supporting the pivot pin 156 and at least partially disposed between the door 20 and the central body portion 21. As shown in FIG. 15A, the seat backing 36 may define a pass-through opening 37 with a pass-through door 39 that can be removed or moved that leads to a location behind the seat back such as a pickup bed or the vehicle trunk. If an attached part, the pass-through door 39 is preferably hinged with the hinges on the same side as those for door 20. The pass-through door 39 may also have a latch to the surface on which it mounts to hold it shut.

With reference to FIGS. 16 and 17, the structure and operation of the seat assembly 12 shown in FIGS. 14 and 15 is similar to the structure and operation of the seat assembly 12 shown in FIGS. 16 and 17. In the interest of brevity, the differences between the embodiment shown in FIGS. 14 and 15 and the embodiment shown in FIGS. 16 and 17 are described below. In this embodiment, the hinge mechanism 146 is optionally partially disposed in a body recess 23 formed by the central body portion 21 of the seatback body 18 in order to facilitate opening the door 20. The body recess 23 may have an undulated shape in order to receive a portion of the hinge mechanism 146. Alternatively, the hinge mechanism 146 could be positioned further laterally away from the central body portion 21 eliminating the need for a body recess 23. In this embodiment, the hinge mechanism 146 includes a hinge link 154 coupled between the door 20 and the seatback body 18. The hinge link 154 is fixed to the seatback body 18 and remains stationary relative to the door 20 and the seatback body 18 as the door 20 moves between the open position (FIG. 17) and the closed position (FIG. 16). The door 20 defines a door slot 25 configured, shaped, and sized to slidably receive a pivot pin 156. The pivot pin 156 disposed in the door slot 25 pivotally couples the hinge link 154 to the door 20. Because the pivot pin 156 is slidably disposed in the door slot 25, the door 20 can translate relative to the seatback body 18 as it moves from the closed position to the open position. The hinge mechanism 146 may optionally include a sliding joint 500. The sliding joint 500 includes a sliding bracket 502 defining a curved slot 504. The sliding bracket 502 is directly coupled to the door backing 45 and is partially positioned in the body recess 23 when the door 20 is in the closed position. The curved slot 504 is configured, shaped, and sized to receive a sliding pin 506 in order to guide the movement of the door 20 when the door 20 moves between the open position and the closed position. Due to the complex motion of this hinge mechanism 146 in FIGS. 16 and 17 the axis of hinge rotation also changes as the hinge rotates open and shut.

With reference to FIGS. 18 and 19, the seat assembly 12 may include a thermal control system 600 configured to heat and/or cool the seatback internal compartment 22. The thermal control system 600 is at least partially disposed in the internal compartment 22 in order to minimize the space used by the thermal control system 600 in the seat assembly 12. In the depicted embodiment, the thermal control system 600 includes a thermoelectric device 602. In the present disclosure, the term "thermoelectric device" refers to a device that uses the thermoelectric effect so that, when a voltage is applied to it, it creates a temperature difference. In the depicted embodiment of FIG. 19, for example, half of the thermoelectric device 602 is disposed inside the internal compartment 22, and the other half of the thermoelectric device 602 is disposed outside the internal compartment 22 in order to minimize the space occupied by the thermoelectric device 602 while providing an avenue for the heat to escape the internal compartment 22. The thermoelectric device 602 includes a first heat exchanger 604, a second heat exchanger 606, and a thermoelectric material 607 disposed between the first heat exchanger 604 and the second heat exchanger 606. Each of the first heat exchanger 604 and the second heat exchanger 606 may include a plurality of fins to enhance heat transfer. The thermoelectric material 607 may be wholly or partly made of p-type and n-type semiconductors. A housing 608 may enclose the thermoelectric device 602. A power supply 610, such as battery or other vehicle power source, is electrically connected to the thermoelectric material 607 and can therefore supply voltage to the thermoelectric material 607. When a voltage is supplied to the thermoelectric material 607, heat is transferred from the first heat exchanger 604 to the second heat exchanger 606 or vice versa. Reversing the polarity of the current that traverses the thermoelectric material 607 changes the direction of the heat transfer. For example, the thermoelectric device 602 can be used to heat the seat assembly 12. Alternatively, the polarity of the current that traverses the thermoelectric material 607 can be reversed in order to cool the seat assembly 12 using the thermoelectric device 602.

With continued reference to FIGS. 18 and 19, the thermal control system 600 further includes a fan assembly 612 including a fan motor 614, a fan 616 coupled to the fan motor 614, and a fan shroud 618 enclosing the fan 616. The fan motor 614 can rotate the fan 616 in order to drive gases G, such as air, within and external to the internal compartment 22. The rotation of the fan 616 can be reversed if desired. The fan assembly 612 circulates gases, such as air, inside and external to the internal compartment 22 in order to heat or cool the seat assembly 12. The seat assembly 12 may include gas-impermeable seals 620, such as flexible gaskets, coupled to the compartment backing portion 58 in order to prevent the gases from escaping the internal compartment 22 through an undesired location. A thermally-insulated shell 622 can be attached to the compartment backing portion 58 to prevent heat or cold from escaping the internal compartment 22 through an undesired location. Although the present disclosure describes the thermoelectric device 602, the thermal control system 600 may include any other suitable device capable of transferring heat or cold.

With reference to FIGS. 20 and 21, the internal compartment 22 of the seat assembly 12 is thermally insulated as discussed above with respect to FIGS. 18 and 19. For example, the seat assembly 12 may include gas-impermeable seals 620, such as flexible gaskets, coupled to the compartment backing portion 58 in order to prevent the gases from escaping the internal compartment 22 through an undesired location. The seat assembly 12 includes a thermal control system 700 that includes external source 702 capable of heating or cooling the internal compartment 22. The external source 702 is located outside the internal compartment 22 in order to maximize the storage space inside the internal compartment 22 and can function as a heat source or a cold source. For example, the external source 702 may be a fluid source, such as a gas source (e.g., air source) capable of storing cold or hot gases (e.g., air). The external source 702 is in fluid communication with the internal compartment 22 through an inlet 704. In other words, the inlet 704 fluidly couples the external source 702 to the internal compartment 22 of the seat assembly 12. Accordingly, hot or cold gases G can flow from the external source 702 to the internal compartment 22. For example, gases G can be pumped into the internal compartment 22 using a pump. After cooling or heating the internal compartment 22, gases G can exit the internal compartment 22 through a vent 706. The vent 706 may include a vent frame 708 and louvers 710 movably coupled to the vent frame 708. The louvers 710 can move relative to the vent frame 708 in order to allow the user to control how quickly the gases are circulated through the internal compartment 22 either via direct mechanical intervention or remote powered operation.

With reference to FIGS. 22 and 23, in this seat assembly 12, the seatback 14 can move (e.g., rotate) relative to the seat base 16 between an upright position (FIG. 22) and a folded down position (FIG. 23) using any suitable hinge mechanism (not shown). The seatback defines an open tray 800 between the compressible seat portion 38 and the seat backing 36. The seat backing 36 may be a wall of a vehicle, such as one separating a rear row of seats from a pickup box. When the seatback 14 is in the upright position (FIG. 22), the open tray 800 is enclosed by the compressible seat portion 38 and the seat backing 36. When the seatback 14 is in the folded down position, the open tray 800 is accessible and can be used to store items. As shown in FIG. 22A, the seat backing 36 may define a pass-through opening 37 with a pass-through door 39 that can be removed or moved that leads to a location behind the seat back such as a pickup bed or the vehicle trunk when the seatback 14 is in either the upright or the folded down position. If an attached part, the pass-through door 39 is preferably hinged with the hinges on the same side as those for door 20. The pass-through door 39 may also have a latch to the surface on which it mounts to hold it shut. The pass-through may also have a seal around it to prevent outside elements from penetrating around its perimeter.

While the best modes for carrying out the teachings have been described in detail, those familiar with the art to which this disclosure relates will recognize various alternative designs and embodiments for practicing the teachings within the scope of the appended claims. For instance, the hinges on the door 20 can be located on the outboard side of the door 20 with the latch on the inboard side of the door 20. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A seat assembly, comprising:
a seatback including a seatback body and a door pivotally coupled to the seatback body, wherein the seatback defines an internal compartment and an opening leading to the internal compartment, and the seatback defines a first seatback edge and a second seatback edge opposite the first seatback edge;
wherein the door is rotatable relative to the seatback body about an axis, the axis extends from the first seatback edge to the second seatback edge, the door is movable relative to the seatback between an open position and a closed position, the door covers the opening leading to the internal compartment when disposed in the closed position, and the internal compartment is accessible through the opening when the door is in the open position;
a seat base operatively coupled to the seatback, wherein the first seatback edge is closer to the seat base than the second seatback edge; and
a biasing member configured to move the door toward a partially open position when the door is unlatched.

2. The seat assembly of claim 1, further comprising a hinge mechanism pivotally coupling the door to the seatback body, wherein the hinge mechanism is configured to at least partially rotate relative to the seatback body.

3. The seat assembly of claim 1, further comprising a hinge mechanism pivotally coupling the door to the seatback body, wherein the hinge mechanism is configured to at least partially translate relative to the seatback body.

4. The seat assembly of claim 1, wherein the seatback includes a compressible seat portion, and the seat assembly further includes a hinge mechanism located outside the compressible seat portion.

5. The seat assembly of claim 1, wherein a hinge edge of the door is configured to move laterally away from a central body portion of the seatback body as the door is opened.

6. The seat assembly of claim 1, further comprising a hinge mechanism pivotally coupling the door to the seatback body, wherein the hinge mechanism is configured to raise the door as the door moves from the closed position to the open position.

7. The seat assembly of claim 6, wherein the seatback body overlaps the door or defines a tapered edge.

8. The seat assembly of claim 1, wherein the door defines a first door surface and a second door surface opposite the first door surface, wherein the first door surface faces away from the internal compartment when the door is in the closed position, the second door surface faces toward the internal compartment when the door is in the closed position, the seat assembly further includes a hinge mechanism pivotally coupling the door to the seatback body, and the hinge mechanism is closer to the second door surface than to the first door surface.

9. The seat assembly of claim 1, further comprising a latch mechanism configured to couple the door to the seatback body when the door is in the closed position.

10. The seat assembly of claim 9, wherein the latch mechanism includes a latch coupled to one of the door and the seatback body when the door is in the open position.

11. The seat assembly of claim 1, wherein the door includes a compressible door portion and a door backing, the compressible door portion defines a seating surface, and the door backing is disposed between the compressible door portion and the internal compartment when the door is in the closed position.

12. The seat assembly of claim 1, further comprising a plurality of nested shelves coupled to one of the door and the internal compartment.

13. The seat assembly of claim 1, further comprising a hinge mechanism with a changing axis of rotation as the door is opened or is closed.

14. The seat assembly of claim 1, further comprising a hinge mechanism pivotally coupling the door to the seatback body, wherein the hinge mechanism is configured to at least partially rotate relative to the seatback body, the door includes a compressible door portion and a door backing, the compressible door portion defines a seating surface, the door backing is disposed between the compressible door portion and the internal compartment when the door is in the closed position, the hinge mechanism is entirely disposed outside the compressible door portion, the seatback includes a compressible seat portion, and the hinge mechanism is entirely disposed outside the compressible seat portion.

15. The seat assembly of claim 14, wherein seatback body includes a compartment backing portion partially defining the internal compartment, the compartment backing portion is directly coupled to the compressible seat portion, the hinge mechanism includes a hinge bracket directly coupled to the compartment backing portion such that the hinge bracket remains stationary relative to the seatback body while the door moves between the open position and the closed position, the hinge bracket defines a bracket recess, the hinge mechanism further includes a hinge block directly coupled to the door backing, the bracket recess is sized to receive the hinge block when the door is in the closed position, and a plurality of hinge links are pivotally coupled between the hinge bracket and the hinge block.

16. A seat assembly, comprising:
a seatback including a seatback body and a door pivotally coupled to the seatback body, wherein the seatback defines an internal compartment and an opening leading to the internal compartment, and the seatback defines a first seatback edge and a second seatback edge opposite the first seatback edge;
wherein the door is rotatable relative to the seatback body about an axis, the axis extends from the first seatback edge to the second seatback edge, the door is movable relative to the seatback between an open position and a closed position, the door covers the opening leading to the internal compartment when disposed in the closed position, and the internal compartment is accessible through the opening when the door is in the open position;
a seat base operatively coupled to the seatback, wherein the first seatback edge is closer to the seat base than the second seatback edge; and
wherein the door defines a first door surface and a second door surface opposite the first door surface, the first door surface faces away from the internal compartment, the second door surface faces toward the internal compartment, and the seatback further includes one of a shelf coupled to the second door surface, a hook coupled to the second door surface and a sleeve coupled to the second door surface.

17. A seat assembly, comprising:
a seatback including a seatback body and a door pivotally coupled to the seatback body, wherein the seatback defines an internal compartment and an opening leading to the internal compartment, and the seatback defines a first seatback edge and a second seatback edge opposite the first seatback edge;
wherein the door is rotatable relative to the seatback body about an axis, the axis extends from the first seatback edge to the second seatback edge, the door is movable relative to the seatback between an open position and a closed position, the door covers the opening leading to the internal compartment when disposed in the closed position, and the internal compartment is accessible through the opening when the door is in the open position;
a seat base at least operatively coupled to the seatback, wherein the first seatback edge is closer to the seat base than the second seatback edge; and
at least one of shelf inside the internal compartment, a hook inside the internal compartment, and a sleeve inside the internal compartment.

18. The seat assembly of claim 17, wherein the at least one of a shelf, a sleeve, and a hook is removable from the internal compartment.

* * * * *